United States Patent Office 3,206,303
Patented Sept. 14, 1965

3,206,303
PROCESS FOR PRECIPITATING SOLUBILIZED SILICA FROM ACIDIC AQUEOUS MEDIA
Mayer B. Goren, Golden, Colo., assignor to Kerr-McGee Oil Industries, Inc., a corporation of Delaware
No Drawing. Filed Sept. 19, 1960, Ser. No. 56,657
10 Claims. (Cl. 75—97)

This invention broadly relates to the treatment of aqueous media containing solubilized silica to reduce the silica content and, in some of its more specific variants the invention further relates to improved hydrometallurgical processes for the recovery of metal values from aqueous media containing solubilized silica and a novel synthetic silica product.

A variety of processes deal with aqueous media containing colloidally dispersed or molecularly dissolved silica, and such solutions are frequently encountered in hydrometallurgical operations wherein valuable metal ores undergo a treating step involving contacting the ore with an aqueous acidic leaching solution for the purpose of solubilizing desired metal values. Examples of such processes include the acid leaching of copper, vanadium, nickel, and zinc ores, among others. During the course of the acidic leaching step, which may be mild or quite vigorous, the siliceous constituents of the gangue may be attacked and part of the silica content of the ore effectively solubilized along with the desired metal either as a substantially molecular silicic acid or as a polymer of colloidal to sub-colloidal dimensions. In still other hydrometallurgical operations, impure concentrates of metals may be contaminated with "solubilized" or colloidal silica, and acid dissolution of the concentrates for further processing may give solutions contaminated with silica. In both types of processes, the silica may present difficulties in subsequent processing steps. Neutralization of the solutions to hydrolytically precipitate the metal values invariably yields a product at least partially contaminated by silica. If the liquors are to be processed by ion exchange techniques, the silica may be strongly adsorbed by an ion exchange resin or it may actually undergo precipitation within the resin pores of either anion or cation resins and interfere with the smooth operation of the process. Of even greater concern is the interference of the solubilized silica with liquid-liquid solvent extraction processes of the types which are currently of great importance in hydrometallurgical technology. In these solvent extraction processes, the aqueous solution of the metal is usually intimately contacted in suitable prior art mixing devices with an organic liquid having solvent power for the desired metal values or with an organic solution of such a material, and the metal values are extracted from the aqueous phase into the organic phase. The immiscible liquids are then allowed to separate before they continue through the process. The presence of materials having surface active properties hinders the complete, rapid separation of the aqueous and organic phases, and were essentially complete separation is not achieved entrained aqeuos phase will contaminate the organic phase, or vice versa. The reasons for avoiding such entrainment are obvious and well known to those skilled in the art, as is the knowledge that rapid and complete separation of the two phases is generally considered to be essential.

Among surfaces active materials which promote phase disengagement difficulties is silica, such as the solubilized silica in acid leach liquors discussed above. The form in which the solubilized silica is present in the aqueous solution undoubtedly has a bearing on its effectiveness in promoting emulsification, and it is believed by those skilled in the art that it is probably not simply silicic acid ($Si(OH)_4$) which is deleterious, but more likely a polymerized form of either sub-colloidal or colloidal dimensions. Thus, it may be demonstrated that the introduction of carefully prepared silicic acid wherein lttle or no polymer exists has substantially no effect on the phase separation behavior of an organic solvent-aqueous leach liquor system. More condensed silicic acids, such as those characterized by an ability to coagulate a "solution" of egg albumen or of other materials described herein does have marked deleterious effects on the ease of separation of a variety of solvent-leach liquor systems. Examples of these organic solvents include the water-insoluble alkyl and dialkyl phosphates, high molecular weight primary, secondary and tertiary amines, mixtures of these reagents which may be dissolved in kerosene as a diluent vehicle, as well as simple inert hydrocarbon systems such as kerosene, hexane, etc. Relatively small amounts of condensed silicic acid markedly hinder phase separation after intermixing the two liquids, and also usually tend to stabilize the mixing system in such a fashion that the aqueous phase is continuous rather than the organic phase. In instances where it is desired that the organic phase be continuous due to number of benefits obtained thereby, the stabilization of the aqeuous phase as the continuous may markedly interfere with the smooth and efficient operation of the solvent extraction process. Accordingly, it is readily apparent that the presence of solubilized silica in leach liquors frequently introduces costly operating difficulties into hydrometallurgical processes, and that the elimination of such silica from the leach liquors would be of great commercial importance. However, prior to the present invention there has been no satisfactory method for effectively reducing the colloidally dispersed or molecularly dissolved silica of the type discussed above, although the need for such a process has long existed.

It is an object of the present invention to provide a novel process for reducing the solubilized silica content of aqueous media.

It is a further object of the present invention to provide an inexpensive and practical process for the treatment of aqueous acidic solutions containing dissolved or colloidally dispersed silicic acids wherein the treated solutions contain substantially no partly polymerized silica as indicated by certain precipitants which are sensitive to the presence of such colloidal to sub-colloidal solubilized silica.

It is still a further object of the present invention to provide an improved hydrometallurgical process for the recovery of metal valves from aqueous media containing solubilized silica which includes a step for the reduction of silica present in dissolved or colloidally dispersed form.

It is still a further object of the present invention to provide an improved hydrometallurgical process for the recovery of metal values from aqueous media containing solubilized silica in partly polymerized form wherein the silica interferes with the recovery of the metal values, which process enables the separation of the silica in a solid filtrable form so that the treated liquors may be processed without difficulty in an ion exchange or solvent extraction step for the recovery of desired metal values.

It is still a further object of the invention to provide a novel synthetic silica.

Still other objects and advantages of the present invention will be apparent to those skilled in the art upon reference to the following detailed description and the examples.

I have discovered a selective precipitation phenomenon for partly polymerized soluble silica which is exhibited by certain organic materials containing a polyoxyethylene structure. Thus, high molecular weight polyethylene glycols having a molecular weight form about 5,000 to several million are very useful in precipitating and binding colloidal and sub-colloidal silica from aqueous media. Lower molecular weight organic materials such as the polyethoxylated phenols and polyethoxylated long chain amides and amines are also of utility in such applications and serve as convenient and readily accessible reagents with which to test for the presence of solubilized silica in aqueous media containing partly condensed silicas which promote the processing difficulties mentioned herein. An acid leach liquor which contains dissolved partly condensed silica will give a precipitate ranging in nature from feathery floccules to an agglomerated rubbery material depending upon the molecular weight of the precipitate when treated with the foregoing reagents. If the liquors are treated with sufficient reagent and preferably the very high molecular weight poly(ethylene oxides) such as Polyox, which is a high molecular weight polyethylene oxide marketed by Union Carbide Corporation, the resulting liquor from which the rubbery silica-organic complex has been separated will no longer give a precipitate on further addition of these reagents and will behave normally in a solvent extraction and ion exchange processes with substantially no interference from silica. Analysis shows that the so treated liquors still contain some silica, and it is believed that the residual silica remaining in solution which is not precipitatable by the reagent and which causes no emulsion difficulties in solvent extraction processes is either unimolecular silicic acid or a low molecular weight condensed polymer thereof. Fresh, carefully prepared silicic acid solutions of very low degree of condensation may be added to silica-free leach solutions of the type described above to give doped leach liquors of high silica content which are free of emulsification problems and which will give no precipitation with polyoxyethylated organic reagents. On the other hand, doping of such solutions with silica solutions prepared in a manner such that considerable soluble but condensed silicic acid is formed will give doped liquors with all the limitations to processing discussed hereinabove and which afford precipitates with these selective reagents. For convenience, "Triton X–100," a proprietary product of Rohm & Haas Company which is a polyoxyethylated phenol, has been employed for the qualitative detection of solubilized silica by a test procedure wherein one or two drops of the commercial material is added to several milliliters of the acidic solution to be tested. I refer to this test as being the "Triton Test." Other materials of related structure such as the "Carbowax" products and "Ucon" lubricants marketed by Union Carbide Corporation and the water dispersible "Etho" series of compounds "Ethomids," "Ethomeens," etc., marketed by Armour & Company, all of which have polyovyethylene structures, serve equally well in this qualitative test and form feathery flocculent precipitates which are indicative of the presence of the condensed "soluble" polysilicic acids.

I have made the surprising discovery that the harmful partially condensed silicic acids as well as at least some of the much lower molecular weight silica content of aqueous media may be precipitated in an easily separable form by the expedient of heating the aqueous media under critical conditions of pH and in the presence of catalytic amounts of certain simple electrolytes which act as a catalyst for the condensation. The novel synthetic silica or hydrous silica precipitate prepared in this manner is different in physical properties from the commercially available silica gels and may be used as superior carriers and supports for catalysts, as dehydrating agents, etc.

The precipitation of silicic acid or the production of silica gel from solutions of alkali silicates has been extensively studied and reported in papers of C. B. Hurd, Weyl, and Hauser, and has been reviewed in E. A. Hauser's text Silicic Science, published by D. Van Nostrand Company, Incorporated, in 1955. From the results of the extensive investigations of Hurd and of other workers in the field, the mechanism of condensation of unimolecular silicic acid to the high molecular weight polymer has been well elucidated and it has been shown that the polymerization proceeds at its maximum rate, as judged from the time of gelling of silicic acids sols, at a pH near 8.0. Below a pH of 5.0, the condensation proceeds very slowly. The now accepted mechanism of the condensation and the structure of the silicic acid gel are reviewed in the Hauser text referred to above, and Hauser states the accepted view heretofore has been "such a condensation process is not affected by the presence of the ions of ordinary salts" (Hauser, E. A., ibid, page 62).

In accordance with one variant of the invention, the colloidal, sub-colloidal and apparently even unimolecular silicic acid present in aqueous media, whether synthetic or obtained in actual acid leaching of ores or from other sources, can be caused to condense and precipitate from such aqueous media as an insoluble material which may be referred to herein as silica by heating in the presence of catalytic amounts of a soluble substance yielding aluminum ion in solution and at pH between 2.0 and 7.0. Preferably, the aqueous medium is heated at a temperature between 80° C. and the boiling point and with the pH being 2.5–3.5. In synthetic solutions free of other electrolytes, it is beneficial that a small amount of simple electrolyte such as sodium sulfate be added to aid in the formation of the precipitated silica. This is in marked contrast to the accepted teachings of the art that the condensation process is not affected by the presence of ions of ordinary salts.

The ratio of dissolved aluminum to solubilized $SiO_2$ in the aqueous media has certain critical features which result from the pH at which the precipitation takes place. For instance, between a pH of about 2.0 and 3.5, and preferably 2.5–3.5, the quantity of aluminum ion needed to catalyze the condensation is small such as about 1% aluminum by weight based on the silica dioxide content. Much larger proportions may be present without any deleterious effects such as more than an equal weight of aluminum ion based upon $SiO_2$ content. Heating of the above aluminum-silica solutions preferably at the boiling point for 30 to 45 minutes or longer, serves to condense and precipitate colloidal and sub-colloidal silica in solution as well as some of the relatively low molecular weight silica species. The solution following heating then may be processed further, such as in ion exchange and solvent extraction hydrometallurgical operations, without the attendant problems characteristic of the solution prior to the treatment. The solutions may remain at the pH at which they were treated for silica precipitation, or the pH may be lowered or raised without affect on the nature of the precipitated silica.

In instances where the silica containing liquors are treated for silica precipitation above a pH of 3.5, and up to about 7.0, then the ratio of aluminum ion to $SiO_2$ may become relatively critical depending upon the manner in which the treated solution is subsequently treated. Low levels of aluminum ion such about 1% by weight based on the total $SiO_2$ content are effective in bringing about the condensation and precipitation of silica when the solutions are heated, preferably at the boiling point for periods such as about an hour and up to 2–6 hours or longer. Solutions so treated likewise may be processed in ion exchange or solvent extraction operations, either at the pH level at which the silica was precipitated or at lower pH levels, without affect on the precipitated silica. On the other hand, if the aluminum ion to $SiO_2$ ratio is above about 0.15, then reacidification of the pulp after silica precipitation will cause redissolution of the silica either almost totally or in part depending upon the aluminum ion to $SiO_2$ ratio, the higher the ratio the more silica being redissolved. Therefore, if a solution such as a leach liquor has an aluminum to $SiO_2$ ratio which exceeds about 0.15, then the silica precipitation should be carried out at a pH of about 2.0 to 3.5 if a subsequent processing step requires reacidification to some pH level lower than that at which the silica precipitation is made.

If the precipitated silica is filtered from the solution before an adjustment in pH is made, then the ratio of aluminum to $SiO_2$ becomes unimportant so long as a catalytic quantity is maintained. If the treated solution is to proceed to solvent extraction or resin-in-pulp hydrometallurgical processing without filtration prior to such a processing step and pH adjustment to a lower level is required, then a ratio of aluminum ion to $SiO_2$ not greater than 0.15 and preferably 0.01–0.15 should be observed if the silica precipitation step is carried out above a pH of 3.5.

Usually, the leach solution will contain metal ions which are hydrolytically precipitated at pH levels above about 3.0. For this reason, it is fortunate that precipitation of colloidal and sub-colloidal silica is most economically practiced in accordance with the invention at the lower pH level of 2.5 to 3.5 where the ratio of aluminum ion to $SiO_2$ may vary greatly.

The presence of certain valuable metal values in solution may occasionally give rise to losses with the silica precipitate. Thus, the coexistence in a leach liquor of ferric ion and valuable quinquevalent vanadium will result in precipitation of ferric vanadate at a pH of 2.5 or greater when the solution is heated, and vanadium values may be lost in this manner. Such a loss may be prevented by reduction of the vanadium to the quadrivalent state with iron or sulfur dioxide as a reductant, or still other reducing agents may be used. The precipitation of silica seems to be unaffected by the presence of extraneous metal values in solution except that simple salts such as sodium sulfate or the like aid in coagulating the silica when the precipitation under aluminum ion catalysis is carried out in an otherwise electrolyte free system.

The aluminum content necessary to catalyze the condensation may be present naturally or all or a portion may be added to the aqueous media in the form of soluble aluminum salts or substances such as alum and the like.

be at least 0.01 to 0.05 or higher, depending upon the pH levels at which the liquor will be treated in further processing steps.

The foregoing detailed description and the following specific examples are for purposes of illustration only, and are not intended to be limiting to the spirit or scope of the appended claims.

EXAMPLE I

This example illustrates the behavior of a simple acidified sodium silicate solution under the influence of various quantities of aluminum added as aluminum sulfate in the absence of any additional electrolyte.

The tests were conducted as follows: A stock silica solution was prepared by diluting 70 g. of commercial sodium silicate (29%) to 9 liters with water, slowly acidifying with dilute sulfuric acid to pH 1.0 and then diluting to 10.0 liters. This stock solution contained 2.0 g. $SiO_2$ per liter. When prepared in this manner, by slow neutralization, pH ranges are passed through in which considerable autocondensation of the unimolecular silicic acid can take place and the resultant clear "solution" nevertheless contains considerable quantities of polymer in the colloidal and sub-colloidal range. The Triton test for such polymer in this solution is positive as a drop of Triton X–100 added to a few ml. of the solution causes the formation of a feathery off-white precipitate.

To five 500 ml.-portions of the above prepared stock silica solution were added varying quantities of an aluminum sulfate solution and the volume of each aliquot adjusted to 1 liter. Five 200 ml. aliquots of each were then taken and adjusted to various pH levels. No additional electrolyte was added. These solutions were then refluxed at the boiling point for 30 minutes, cooled, filtered to separate any precipitated silica and analyzed for remaining silica and aluminum. Triton tests were carried out on each of the filtrates as qualitative indication of the presence of partly condensed but "soluble" silica. The results are recorded in Table I.

*Table I*

PRECIPITATION OF SILICA FROM WEAK ELECTROLYTE SOLUTION IN PRESENCE OF $Al^{3+}$

| Sample | Original concentrations (g./l.) | | pH to which adjusted | Ppt. formed on heating? | Filtrate concentration (g./l.) | | $SiO_2$ pptd. (g./l.) | Filtrate Triton test |
|---|---|---|---|---|---|---|---|---|
| | $SiO_2$ | Al | | | $SiO_2$ | Al | | |
| 1 | 1.0 | .29 | 1.0 | No | 1.0 | | 0 | + |
| 2 | 1.0 | .29 | 1.5 | No | | | | + |
| 3 | 1.0 | .29 | 2.0 | No | | | | + |
| 4 | 1.0 | .29 | 2.5 | No | .93 | .28 | .07? | + |
| 5 | 1.0 | .29 | 3.5 | Yes | .32 | .25 | .68 | − |
| 6 | 1.0 | .59 | 1.0 | No | .95 | | .05? | + |
| 7 | 1.0 | .59 | 1.5 | No | | | | + |
| 8 | 1.0 | .59 | 2.0 | No | | | | + |
| 9 | 1.0 | .59 | 2.5 | Yes | 0.4 | .57 | .60 | − |
| 10 | 1.0 | .59 | 3.5 | Yes | .30 | .54 | .70 | − |
| 11 | 1.0 | .88 | 1.0 | No | 1.05 | | 0 | + |
| 12 | 1.0 | .88 | 1.5 | No | | | | + |
| 13 | 1.0 | .88 | 2.0 | No | 1.0 | | 0 | + |
| 14 | 1.0 | .88 | 2.5 | No | 1.0 | .90 | 0 | + |
| 15 | 1.0 | .88 | 3.5 | Yes | 0.32 | .85 | .68 | − |
| 16 | 1.0 | 1.17 | 1.0 | No | 1.05 | | 0 | + |
| 17 | 1.0 | 1.17 | 1.5 | No | | | | + |
| 18 | 1.0 | 1.17 | 2.0 | No | | | | + (trace) |
| 19 | 1.0 | 1.17 | 2.5 | Yes | .53 | 1.15 | .47 | + (trace) |
| 20 | 1.0 | 1.17 | 3.5 | Yes | .32 | 1.13 | .68 | − |
| 21 | 1.0 | .235 | 1.0 | No | .99 | | 0 | + |
| 22 | 1.0 | .235 | 1.5 | No | | | | + |
| 23 | 1.0 | .235 | 2.0 | No | | | | + |
| 24 | 1.0 | .235 | 2.5 | No | .94 | .24 | .067 | + |
| 25 | 1.0 | .235 | 3.5 | Yes | .35 | .21 | .65 | − |

A considerable fraction of the silica will precipitate at a pH as low as 2.0, but only small or insignificant quantities precipitate at lower pH values. If sufficient aluminum is not present, then a quantity of a soluble aluminum bearing substance should be added and preferably in an amount whereby the ratio of aluminum ion to $SiO_2$ will From an examination of Table I, it is evident that the solutions treated contained about 0.6–.65 g./l. of the $SiO_2$ as a polycondensed yet soluble species. All levels of aluminum treatment effected precipitation of this silica at pH 3.5. No precipitation occurred at pH 1.0, 1.5 and 2.0, while occasionally considerable precipitation took place at pH 2.5. It is also evident that apparently very little aluminum is lost with the precipitate.

EXAMPLE II

This example examines the effect of moderate levels of a simple electrolyte on some of the samples considered in the preceding example. Thus to all the aliquots at pH 2.0, 2.5 and 3.5 appearing in Table I was added sodium sulfate to a concentration of 10 g./liter and the solutions were again heated at the boiling point for 30 minutes, filtered, and once again assayed for residual silica. A preliminary experiment had shown that neither of the samples of lower pH (1.0 and 1.5) responded to such treatment to give any precipitation of silica; accordingly, these were not further examined. The results are presented in Table II, the sample numbers corresponding with those of Table I.

*Table II*

EFFECT OF ELECTROLYTE ON AL-CATALYZED SILICA PREPARATION

| Sample | pH | $SiO_2$ assay (g./l.) | | Triton test | |
|---|---|---|---|---|---|
| | | Table I | After electrolyte addition | Before electrolyte | After electrolyte |
| 3 | 2.0 | (1.0) | .96 | + | + |
| 4 | 2.5 | .93 | .31 | + | − |
| 5 | 3.5 | .32 | .28 | − | − |
| 8 | 2.0 | (1.0) | .57 | + | faint |
| 9 | 2.5 | 0.4 | .31 | − | − |
| 10 | 3.5 | .30 | .28 | − | − |
| 13 | 2.0 | 1.0 | 1.0 | + | + |
| 14 | 2.5 | 1.0 | .40 | + | − |
| 15 | 3.5 | .32 | .31 | − | − |
| 18 | 2.0 | (1.0) | .63 | + | faint |
| 19 | 2.5 | .53 | .38 | Faint | − |
| 20 | 3.5 | .32 | .38 | − | − |
| 23 | 2.0 | (1.0) | .96 | + | + |
| 24 | 2.5 | .94 | .37 | + | − |
| 25 | 3.5 | .35 | .32 | − | − |

Thus, addition of the simple electrolye extends the precipitation range for substantially complete polymer elimination to pH 2.5 and for partial polymer elimination to pH 2.0.

EXAMPLE III

This example considers the lower limit of aluminum/$SiO_2$ ratios necessary for achieving precipitation of the polymerized soluble silica from solution at pH 2.5.

(a) The stock solution of silicic acid from the preceding example (2.0 g. $SiO_2$/l.) was diluted with an equal volume of water. A 200 ml. aliquot was taken and 1.0 g. $Na_2SO_4$ added. The solution was neutralized to pH 2.5 with ammonia and aluminum sulfate solution added to give a ratio of $Al/SiO_2$ of 5/100. The solution was heated at the boiling point for one hour during which considerable precipitation took place. After clarification, the filtrate was analyzed and found to contain 0.4 g. $SiO_2$/liter. The Triton test was essentially negative.

(b) The experiment of part (a) was repeated except that no aluminum was added. After the solution was heated for an hour there was no evidence of turbidity. A sample taken for analysis showed all the original silica to be in solution, and the Triton test on the treated solution was positive.

(c) The experiment of part (a) was repeated except that the aluminum/$SiO_2$ ratio was decreased to 0.025. When the solution had been boiling for 20 minutes much precipitated silica was in evidence. The mixture was maintained at the boiling point for 1.5 hours, cooled and filtered. The filtrate gave a negative Triton test and contained 0.33 g. $SiO_2$/liter.

(d) The experiment of part (c) was repeated except that the aluminum content was halved to give an $Al/SiO_2$ ratio of .0125. After 0.5 hour boiling the solution was heavily opalescent and in 45 minutes precipitation of silica was evident. After a total heating time of one hour, a sample was filtered and analyzed to indicate that the $SiO_2$ concentration had been reduced to 0.53 g. $SiO_2$/l. The Triton test was faintly positive.

It is evident from the results of these experiments that very small quantities of aluminum are necessary and indeed sufficient to catalyze the condensation of the "soluble" silica polymers to the point of insolubility at pH levels where the self condensation reaction apparently is too slow to be of practical significance.

EXAMPLE IV

A series of tests were run under conditions similar to those of the preceding example (pH 2.5, $SiO_2$: 1 g./l., $Na_2SO_4$: 10 g./l.) except that no aluminum was added. Instead, a number of other metal salts were examined at varying concentrations. The resulting solutions were heated at the boiling point for as much as two hours, filtered and the filtrate analyzed for silica content. The results are summarized in Table III.

*Table III*

EVALUATION OF VARIOUS METALS AS CATALYSTS FOR $SiO^2$ PRECIPITATION, pH 2.5

| Metal ion | Ratio, metal/$SiO^2$ | Heating period, hr. | Filtrate $SiO_2$ Concentration (g./l.) | Triton test |
|---|---|---|---|---|
| $Fe^{3+}$ | 0.2 | 1.5 | .96 | + |
| $Mg^{++}$ | 0.18 | 2 | .94 | + |
| $Ca^{++}$ | 0.30 | 2 | .94 | + |
| $Cr^{+++}$ | 1.0 | 1.5 | .97 | + |
| $Be^{++}$ (pH 3.5) | .05 | 4 | (¹) | + |

¹ No pptn. observed.

It is evident that none of the metal ions examined effect condensation of the silicic acid to insolubility.

EXAMPLE V

Solvent extraction and ion exchange operations on acidic leach liquors are ordinarily carried out at pH levels of about 2.5 or lower inasmuch as at higher pH levels hydrolytic precipitation of many of the metals in solution will occur. It was nevertheless of interest to determine whether $SiO_2$ precipitation at higher pH levels could be made to occur and whether reacidification of such silica-depleted liquors containing precipitated silica would affect the precipitate.

(a) As an exploratory experiment, four 100 ml. aliquots of the 2 g./liter stock silica were doped with aluminum sulfate until the $Al/SiO_2$ ratio was just above 1.0 as in experiments 16–20 of Example I. Sodium sulfate was added to an eventual final concentration of 10 g./l. and the solutions diluted to 200 ml. each. The four aliquots were then adjusted to pH 2.5, 3.5, 5.0 and 7.0 respectively, heated at the boiling point for 30 minutes, cooled, reacidified to pH 1.5, reheated for ½ hour, filtered and the filtrates analyzed for silica. The following results were obtained:

| Sample | pH | Appearance after first boiling | Appearance after second heating | $SiO_2$ assay of filtrate g./l. |
|---|---|---|---|---|
| 1 | 2.5 | Cloudy with ppt | Cloudy with ppt | 0.22 |
| 2 | 3.5 | do | do | 0.22 |
| 3 | 5.0 | do | Clear—no ppt | .92 |
| 4 | 7.0 | do | do | .94 |

It is therefore evident that if the treated pulps are to be reacidified there is a maximum pH between pH 3.5 and 5 beyond which these solutions cannot be treated when considerable aluminum ion is present.

(b) The conditions of the experiments in part (a) were duplicated except that the pH during the initial heating period was maintained at 4.0. At the end of the heating period (one hour), the mixture was cooled, allowed to settle and a 25 ml. aliquot was sampled for $SiO_2$ analysis, which indicated the $SiO_2$ concentration to be only 0.164 g./liter (down from 1.0). This aliquot gave a negative Triton test. Twenty-five ml. of water was added to the remainder of the sample to make up for the portion withdrawn and the pH was adjusted down to 1.5. During the acidification, essentially all of the precipitate dissolved. Analysis of a filtered aliquot showed the $SiO_2$ concentration now to be 0.98 g./l., and the so acidified solution gave a positive Triton test.

When this same solution was now adjusted to pH 2.5 and heated at the boiling point, the silica precipitated again and did not redissolve on reacidification.

It is evident then from these experiments that a pH between pH 3.5 and pH 4.0 can be tolerated for the insolubilization of the silica if the solutions are of relatively high Al content and the pulps are to be reacidified after the $SiO_2$ precipitation.

EXAMPLE VI

This example examines the effect on the acid solubility of the silica precipitated in systems of low aluminum/$SiO_2$ ratios, the $SiO_2$ being precipitated at a pH above 3.5.

(a) 50 ml. of the stock silica solution (2 g./l) were treated with 1 g. $Na_2SO_4$ and stock Al solution added to give an Al/$SiO_2$ ratio of about .07. The mixture was diluted to 100 ml. and neutralized to pH 4.0 with ammonia. A flocculent precipitate was present. The mixture was heated at the boiling point for one hour and a 25 ml. sample of clarified liquor taken for analysis. The Triton test was negative and the solution contained 0.17 g. $SiO_2$/liter. Twenty-five ml. of water was added, the pulp reacidified to pH 1.5 and boiled for 15–20 minutes. The solid did not redissolve; a filtered sample gave a negative Triton test, analysis indicating the residual silica content to be 0.20 g. $SiO_2$/liter.

(b) When this experiment was repeated and the first heating period terminated at half an hour, reacidification effected dissolution of much of the precipitate. Thus, high pH treatment at low Al/$SiO_2$ ratios requires somewhat longer heating for effecting real insolubilization of the precipitate. A recheck of the experiment (a) on a second sample confirmed that a heating time of at least about one hour was necessary under these conditions.

(c) The conditions of the previous experiments were duplicated except that the Al/$SiO_2$ ratio was held at .06 and pH was 4.1. After 20 minutes' heating a sample was removed, cooled and reacidified to pH 1.5. All of the precipitate present redissolved. The remainder of the sample was maintained at the boiling point for an additional 40 minutes, and when then reacidified, the silica precipitate did not redissolve.

(d) The conditions of part (a) were duplicated except that the Al/$SiO_2$ ratio was decreased to .023. When the system was adjusted to pH 4.05, there was no evidence of any precipitation. However, after the solution was heated to the boiling point, much silica precipitate formed. The mixture was maintained at the boiling point for one hour, cooled, reacidified to pH 1.5 and again heated for 30 minutes. The precipitate did not redissolve and a filtered sample gave a negative Triton test and was found to contain 0.22 g. $SiO_2$/liter.

(e) The conditions of the previous experiment were duplicated except that the Al/$SiO_2$ ratio was decreased to .0025 and the pH was maintained at 6.8 during the heating. Polymerization and precipitation were quite slow, sixteen hours being required to effect formation of considerable silica. The pulp was reacidified to pH 1.5 and heated as before. A filtered sample of the so treated liquor gave a faintly positive Triton test and was found to contain 0.40 g./$SiO_2$/liter.

(f) Experiment (e) was repeated except that the Al/$SiO_2$ ratio was increased to .0125 and the pH was held at 5.0. In one hour at the boiling point about half the silica had precipitated in an acid insoluble form. The filtered reacidified pulp contained 0.56 g. $SiO_2$/liter and gave a slightly positive Triton test.

(g) The preceding experiments at pH 4.0 were repeated except that the Al/$SiO_2$ ratio was increased to about 0.5. After the usual heating, cooling, reacidification and reheating, the filtered sample was found to contain above 0.5 g. $SiO_2$/liter, and afforded a positive Triton test.

(h) The conditions of experiment (g) were repeated except that the Al/$SiO_2$ ratio was decreased to about 0.25. The filtered final solution assayed 0.26 g. $SiO_2$/liter and gave a negative Triton Test.

Accordingly, from these experiments it is evident that a maximum Al/$SiO_2$ ratio of about 0.25 and preferably not more than about 0.1–.2 should be maintained if the silica precipitation is to be carried out above pH 3.5 followed by subsequent reacidification of the pulp. If the pulp is filtered before reacidification, it is obvious from the preceding, particularly from the results of Example V, that the Al/$SiO_2$ ratio during the precipitation is not of great importance and in fact may be very high; the condensed silica present in solution is apparently quantitatively precipitated during the heating period in a form which is relatively acid-soluble, but which may nevertheless be separated by filtration before acidification.

EXAMPLE VII (a) An actual leach liquor obtained in the sulfuric acid leaching of a salt roasted-carbonate leached vanadium ore and which gave serious emulsion difficulties in solvent extraction processes, was found to contain high concentrations of partly condensed "soluble" silica by the Triton test, and contained a total $SiO_2$ content of 3.08 g. $SiO_2$ per liter. It also contained in excess of 2.0 g. $Al_2O_3$ per liter as well as considerable ferric iron, etc. Heating of the solution at the boiling point for several hours did not cause precipitation of any silica.

To mitigate against vanadium losses, the solution was reduced by warming with aqueous $SO_2$ until ferrous iron was evident as detected by the ferricyanide tests. At this point all of the vanadium in the liquor was reduced to the quadrivalent state. The solution was adjusted to pH 2.5 and heated at the boiling point for about an hour, during which massive silica precipitation occurred. The silica precipitate was filtered off and the filtrate then examined. It gave a negative Triton test, gave no emulsion formation in solvent extraction, and contained only 0.33 g. $SiO_2$/liter by analysis. Thus it is evident that about 90% of the silica in the liquor was precipitated by this treatment.

(b) Aliquots of $SO_2$-reduced liquor as in (a) above were adjusted to various pH levels and heated at the boiling point to determine the efficiency of silica precipitation.

| Sample pH | Time of heating | Triton test | $SiO_2$ assay (g./l.) |
|---|---|---|---|
| 1.5 | 19 hours | ++ | 2.94 |
| 1.75 | 3 hours | ++ | 2.98 |
| 2.0 | 2 hours | +(light) | 0.70 |
| 2.5 | 1 hour | − | 0.35, 0.26 |
| 3.0* | 1.5 hours | − | 0.23 |
| 3.50* | 1 hour | − | 0.46 |
| 3.75* | 1 hour | ++ | 1.27, 1.46 |

*Reacidified to pH 1.5 before testing for residual silica.

From the results of this example, it is seen that the data obtained on the synthetic system are confirmed for high Al/$SiO_2$ ratios: precipitation followed by reacidification is effective at pH 2.0–3.5, preferably pH 2.5–3.0.

EXAMPLE VIII

This example examines the behavior of the actual leach liquor of the preceding example in simulated and actual solvent extraction processes. Treated or untreated liquors were contacted under conditions of very vigorous agitation and aeration with various solvents under such conditions that the mixing was done with the aqueous phase continuous. This is the most favorable condition for emulsion formation and mutual entrainment of solvents. Uniform agitation for five minutes was maintained, the agitation stopped and the rate of separation of the phases was observed. The treated liquors were not clarified to separate the precipitated silica inasmuch as it has been discovered that the nature of these solids is such that they do not interfere with phase separation. This is in marked contrast to the behavior of most solids contaminants in these leach liquors. The organic liquids which were examined were kerosene, a 10% solution of di-2-ethyl hexyl phosphoric acid (D-2-EHPA) in kerosene; a mixed tridecyl-trilauryl amine (3–4% in kerosene); and finally a solvent made of equal volumes of the amine and di-2-ethyl hexyl phosphoric acid in kerosene (termed "mixed solvent"). The results of these tests are given in the following table. In this table are noted the time required for the first evident separation of clear organic layer and the time for complete clarification of the organic.

PHASE DISENGAGEMENT IN SOLVENT EXTRACTION LIQUOR*

[Phase Disengagement Time]

| | Kerosene | | D-2-EHPA | | Amine | | Mixed solvent | |
|---|---|---|---|---|---|---|---|---|
| | 1st clear organic | Complete sepn. | 1st clear organic | Complete sepn. | 1st clear organic | Complete sepn. | 1st clear organic | Complete sepn. |
| I* | 1.5 min | 3.3 min | | | No trace in 1 hr. | | 4 min | 35 min. |
| II* | 4.5 min | 5 min | | | | | 2 min | 30 min. |
| III* | 0.1 min | 0.4 min | .25 min | 0.8 min | | | 0.25 min | 3 min. |
| IV | | | | | 0.1 min | .25 min | .1 min | .5 min. |

*I—Leach liquor untreated and at pH 1.0.
*II—Leach liquor untreated and at pH 2.5.
*III—Leach liquor reduced with SO$_2$; heated at pH 2.5 for 1.7 hrs. and cooled.
IV—Same as III but heated 4 hrs. at pH 2.5.

With untreated leach liquor, solvent extraction by amine or mixed solvent is almost impossible. When treated as in the preceding, the silica precipitates in a form which does not promote emulsification and the liquor may be treated very effectively even at pH 2.5 with either of the solvents.

What is claimed is:

1. In a process for the recovery of desired dissolved metal values from an aqueous medium which also contains solubilized silica wherein the solubilized silica interferes with the recovery of the desired metal values, the improvement comprising precipitating solubilized silica from the aqueous medium by heating at an elevated temperature in the presence of a soluble substance yielding aluminum ion in solution, the aqueous medium having a pH value of about 2.0–3.5 and the ratio by weight of aluminum ion in solution to solubilized silica when calculated as Al/SiO$_2$ being between about 0.01:1 and about 1.17:1, and thereafter recovering the desired metal values.

2. The process of claim 1 wherein the aqueous medium is heated at a pH value of about 2.5–3.0.

3. The process of claim 1 wherein the aqueous medium is heated at a temperature between about 80° C. and the normal boiling point.

4. The process of claim 1 wherein the desired metal values are recovered by extraction of the aqueous medium with a water immiscible liquid organic extractant.

5. The process of claim 1 wherein the desired metal values are recovered by adsorption with an ion exchange resin.

6. The process of claim 1 wherein the Al/SiO$_2$ weight ratio is in excess of 0.5:1.

7. The process of claim 6 wherein the aqueous medium is heated at a temperature between about 80° C. and the normal boiling point.

8. The process of claim 7 wherein the aqueous medium is heated at a pH value of about 2.5–3.0.

9. The process of claim 7 wherein the desired metal values are recovered by extraction of the aqueous medium with a water immiscible liquid organic extractant, and after precipitation of the silica and prior to the extraction of the metal values, the pH value of the aqueous medium is adjusted to a lower value by addition of an acidic substance and the extraction step is conducted in the presence of the precipitated silica.

10. The process of claim 7 wherein the desired metal values are recovered by adsorption with an ion exchange resin, and after precipitation of the silica and prior to the adsorption of the desired metal values, the pH value of the aqueous medium is adjusted to a lower value by addition of an acidic substance and the adsorption step is conducted in the presence of the precipitated silica.

References Cited by the Examiner

UNITED STATES PATENTS

| | | | |
|---|---|---|---|
| 1,812,347 | 6/31 | Kuhnert | 23—59 |
| 1,843,006 | 1/32 | Stevens et al. | 23—182 |
| 1,858,100 | 5/32 | McAdoo | 23—24.1 |
| 2,550,708 | 5/51 | Meyer | 23—182 X |
| 2,605,228 | 7/52 | Alexander et al. | 23—182 X |
| 2,827,361 | 3/58 | Lebedeff | 23—140 |
| 2,981,601 | 4/61 | Kidde | 23—182 X |
| 3,057,681 | 10/62 | Gernes et al. | 23—182 X |
| 3,119,661 | 1/64 | Stambaugh et al. | 23—182 X |

FOREIGN PATENTS 745,890  3/57  Great Britain.

OTHER REFERENCES

Jeglum: "The Properties of Soluble Silicates," in Chemical Industries, October-November 1941, page 5.

Iler: "The Colloid Chemistry of Silica and Silicates," Cornell Univ. Press, Ithaca, N.Y., 1955, pages 31, 41–48 and 108.

Freundlich: "Colloid and Capillary Chemistry," E. P. Dutton and Co., N.Y., 1922, pages 415–432 (pages 415, 419, 430 and 432 of particular interest).

Taylor: "A Treatise on Physical Chemistry," vol. 2, D. Van Nostrand Company, N.Y., 1931, pages 1691–1698.

MAURICE A. BRINDISI, *Primary Examiner.*
GEORGE D. MITCHELL, *Examiner.*

UNITED STATES PATENT OFFICE
CERTIFICATE OF CORRECTION

Patent No. 3,206,303

September 14, 1965

Mayer B. Goren

It is hereby certified that error appears in the above numbered patent requiring correction and that the said Letters Patent should read as corrected below.

Column 2, line 4, for "lttle" read -- little --; line 23, for "due to number" read -- due to a number --; line 49, for "valves" read -- values --; line 72, for "form" read -- from --; column 3, lines 12 and 13, for "materal" read -- material --; line 51, for "polyovyethylene" read -- polyoxyethylene --; column 7, line 39, for "electrolye" read -- electrolyte --; column 8, Table III, in the heading to the table, for "SiO2" read -- $SiO_2$ --; same table in the heading to column 2, for "metal/SiO2" read -- metal/$SiO_2$ --; column 11, line 68, for "0.5:1." read -- 0.15:1. --.

Signed and sealed this 17th day of May 1966.

(SEAL)
Attest:

ERNEST W. SWIDER
Attesting Officer

EDWARD J. BRENNER
Commissioner of Patents